United States Patent

[11] 3,632,883

[72] Inventor Einar Andreas Aagaard
Emmasingel, Eindhoven, Netherlands

[21] Appl. No. 838,463
[22] Filed July 2, 1969
[45] Patented Jan. 4, 1972
[73] Assignee U.S. Phillips Corporation
New York, N.Y.
[32] Priority July 5, 1968
[33] Netherlands
[31] 6809491

[54] TELECOMMUNICATION EXCHANGE WITH TIME DIVISION MULTIPLEX
3 Claims, 23 Drawing Figs.

[52] U.S. Cl. .......... 179/15 AQ
[51] Int. Cl. .......... H04j 3/00
[50] Field of Search .......... 179/15 AT, 15 AQ, 18 GF; 340/172.5

[56] References Cited

UNITED STATES PATENTS

| | | | |
|---|---|---|---|
| 3,263,030 | 7/1966 | Stiefel | 179/15 AT |
| 3,271,521 | 9/1966 | Von Sanden | 179/15 AT |
| 3,458,659 | 7/1969 | Sternung | 179/15 AT |

*Primary Examiner*—Kathleen H. Claffy
*Assistant Examiner*—David L. Stewart
*Attorney*—Frank R. Trifari

ABSTRACT: A telecommunication exchange with time-division multiplex for conducting information received on a channel of a time-multiplexed communications trunk to a selected channel of a second time-multiplexed communications trunk. The information from all channels is sequentially stored in a cyclic storage register in fixed relationships with cyclic code numbers generated by a local clock generator. At a clock instant determined by the address of an output channel the address of an input channel is serially introduced into a second cyclic register. The output of the second cyclic register is decoded and used to switch the output of the first cyclic register corresponding to the selected input channel to an output line.

Figure 1:
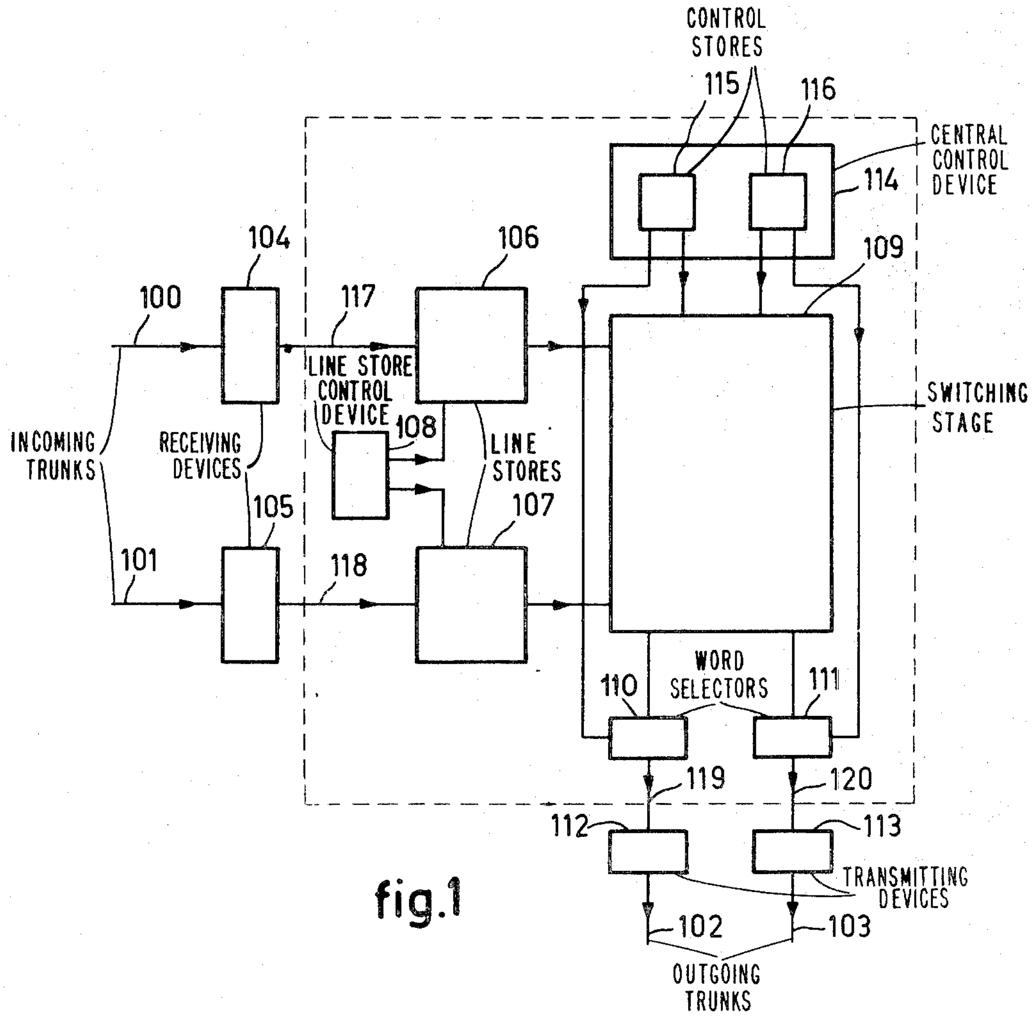

INVENTOR.
EINAR A. AAGAARD
BY
AGENT

INVENTOR.
EINAR A. AAGAARD
BY
[signature]
AGENT

INVENTOR.
EINAR A. AAGAARD
BY
[signature]
AGENT

INVENTOR.
EINAR A. AAGAARD
BY
AGENT

INVENTOR.
EINAR A. AAGAARD
BY
[signature]
AGENT

INVENTOR.
EINAR A. AAGAARD
BY
AGENT

TELECOMMUNICATION EXCHANGE WITH TIME DIVISION MULTIPLEX

The invention relates to a telecommunication exchange with time-division multiplex, which comprises incoming time-division multiplex trunks to which incoming trunk circuits are connected and outgoing time-division multiplex trunks to which outgoing trunk circuits are connected, in which each time-division multiplex trunk is provided with time-division channels to each of which is allotted a particular channel time interval within a cycle of channel time intervals.

Such a telecommunication exchange is known from British Pat. No. 932,612. In the telecommunication exchange disclosed therein the incoming trunk circuits are provided with random access line stores adapted to receive an information in a first-channel time interval and to transmit it in a second-channel time interval. Random access stores are comparatively complicated devices. It is therefore a first object of the invention to provide a telecommunication exchange in which the incoming trunk circuits are provided with simpler stores. This first object of the invention includes particularly the use of line stores adapted to be manufactured in mass production, for example, glass delay lines of the type employed in color television receivers for the PAL- and SECAM color television systems.

In the aforesaid known telecommunication exchange internal blocking may occur, in which state a calling channel of an incoming trunk cannot be connected to a free channel of an outgoing trunk. From British Pat. No. 932,613 it is known to obviate the state of internal blocking by changing the allocation of the channel time intervals to the existing connections. Such a method involves a complicated programming of the exchange processor. Therefore, the invention has furthermore for its object to provide a telecommunication exchange of the kind set forth, which is basically free of internal blocking.

The telecommunication exchange in accordance with the objects of the invention is characterized in that, the incoming trunk circuits are each provided with a cyclid storage device having a storage cycle time equal to one channel time interval and a storage capacity which is at least sufficient for storing the information received in one cycle of channel time intervals through the incoming time-division multiplex trunk, each channel time interval being divided into a number of equal subtime intervals, said number being at least equal to the number of time-division channels of a time-division multiplex trunk each incoming trunk circuit being provided with means for storing the information received through the incoming time-division channels in the cyclic storage device in subtime intervals individually allotted to the time-division channels, means being provided which the establishment of a time-division connection between an incoming channel of an incoming time-division multiplex trunk and an outgoing channel of an outgoing time-division trunk, transmit the information appearing in the subtime interval allotted to the incoming channel of a given channel time interval in each cycle of channel time intervals at the output of the cyclic storage device of the relevant incoming trunk circuit to the relevant outgoing trunk circuit.

Figure 3:
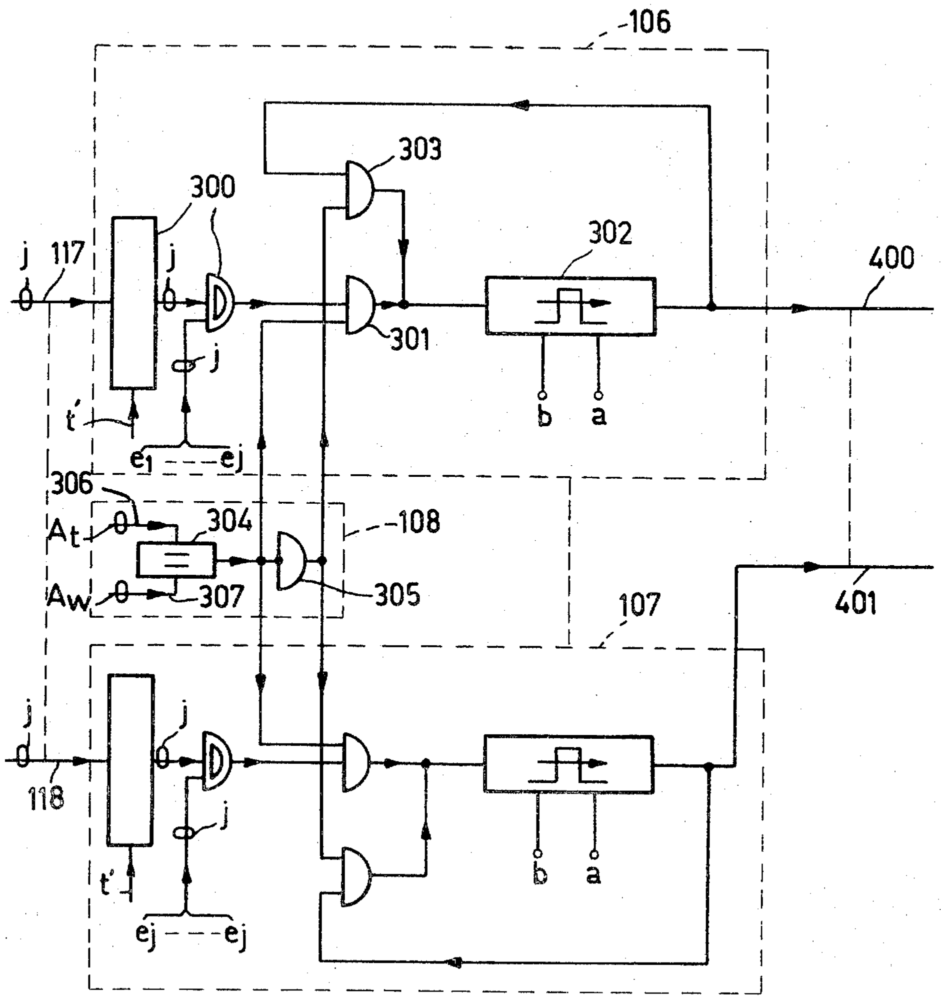
Figure 4:
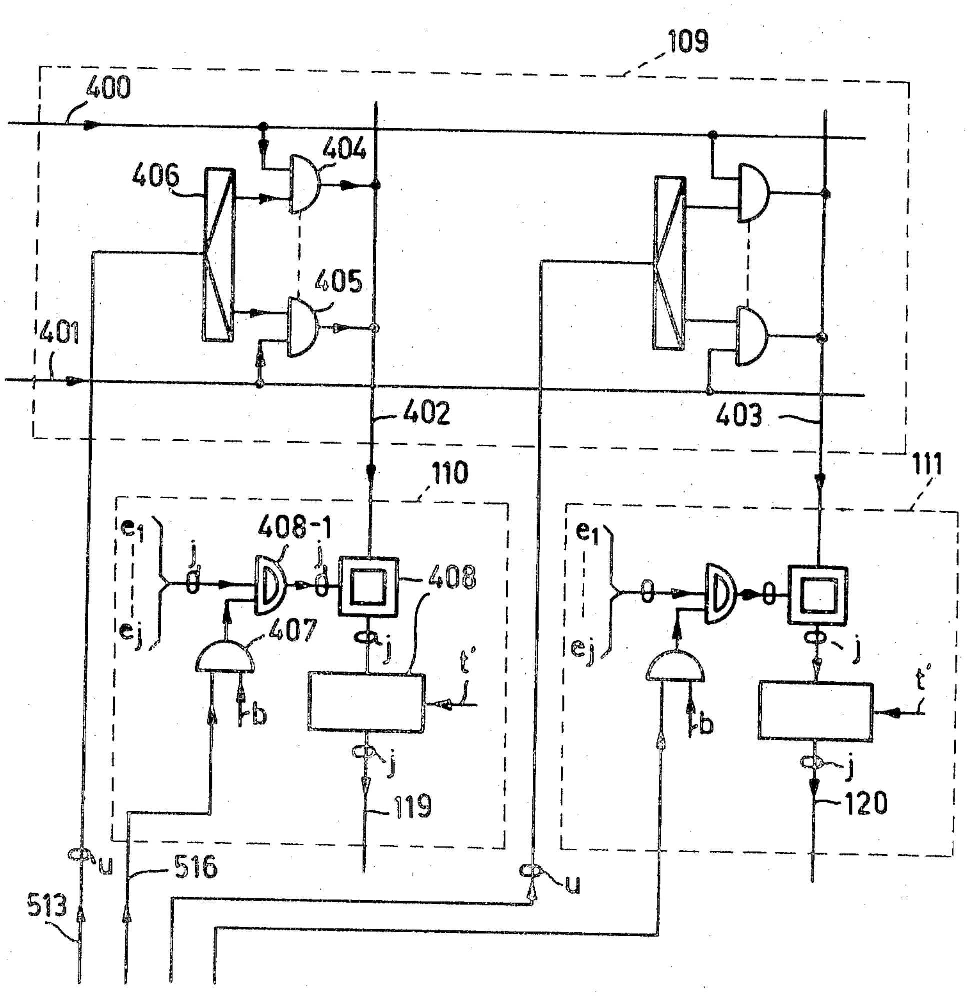
Figure 5:
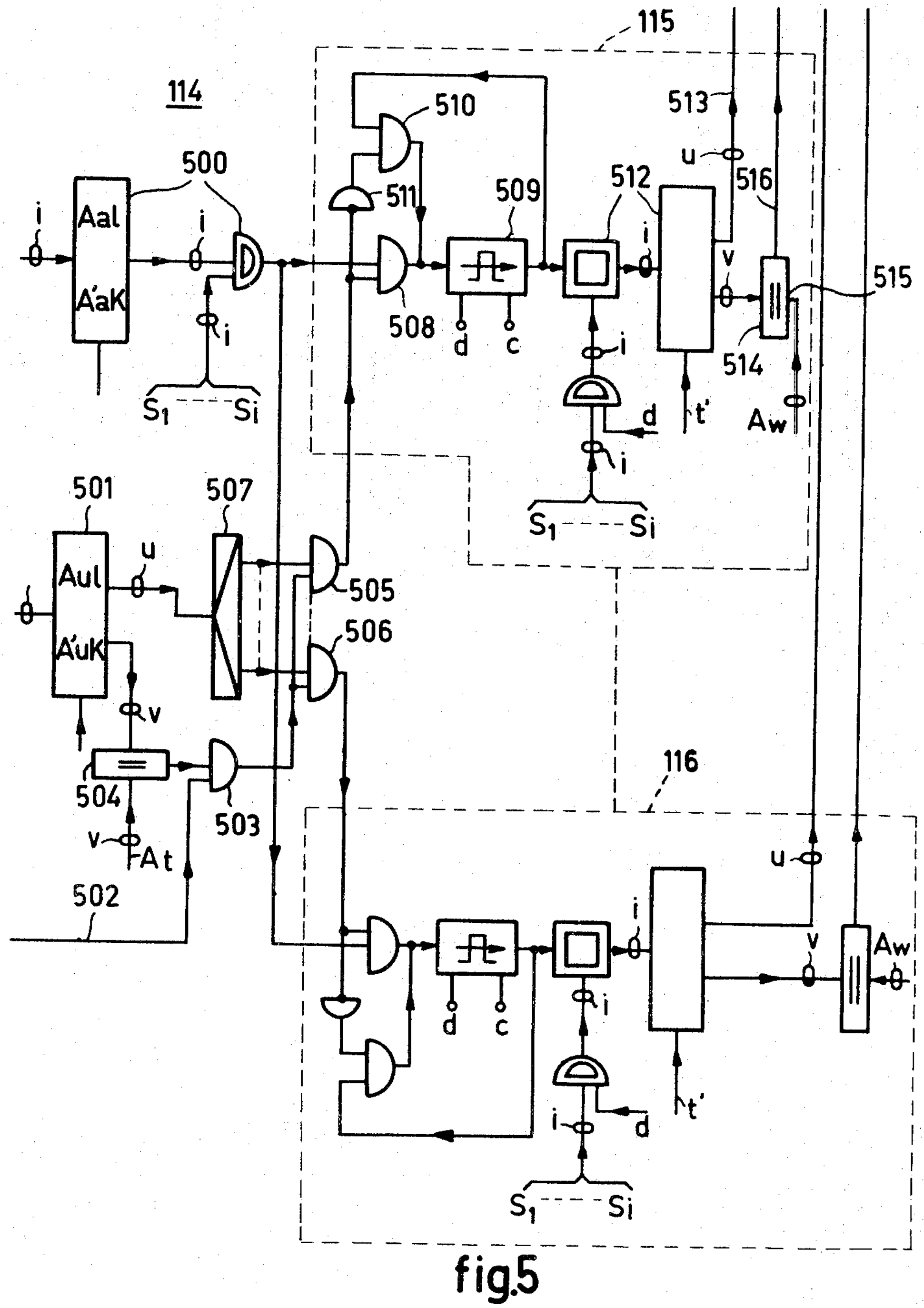

The invention and its advantages will be described more fully with reference to the Figures. Therein FIG. 1 is a simplified block diagram of a time-division multiplex telecommunication exchange in accordance with the invention, FIGS. 2*a* to 2*k* and 2*m* to 2*t* show the symbols used in the further Figures and FIGS. 3, 4 and 5 show a more detailed block diagram of the part of the telecommunication exchange surrounded in FIG. 1 by a broken line.

FIG. 1 shows a simplified block diagram of a telecommunication exchange based on the time-division principle. The reference numerals 100 and 101 designate incoming time-division multiplex trunks through each of which the signals from $n$ telecommunication channels are received and the reference numerals 102 and 103 designate outgoing time-division multiplex trunks through each of which the signals of $n$ telecommunication channels are transmitted. The incoming time-division multiplex trunks 100 to 101 are connected through the receiving devices 104 to 105, to the line stores 106 and 107, which are controlled by the line store control device 108. The line stores 106 to 107 are connected to the inputs of a space-division switching stage 109, the outputs of which are connected to the word selectors 110 to 111. The word selectors are connected to the transmitting devices 112 to 113 of the outgoing time-division multiplex trunks 102 to 103. The telecommunication exchange is furthermore provided with a central control device 114 for controlling the switching stage 109 and the word selectors 110 to 111, said central control device being provided with the control stores 115 to 116, individually allotted to the outgoing time-division multiplex trunks. The receiving device 104 and the line store 106 are together termed the incoming trunk circuit and the same applies to 105 and 107; the word selector 110 and the transmitting device 112 are together termed the outgoing trunk circuit and the same applies to 111 and 113.

By way of example the telecommunication exchange may have the following characteristics:

1. Scanning frequency of each telecommunication channel 8000 Hz. corresponding to a cycle time of $T$=125 $\mu$sec.
2. Number of channels of a trunk $n$=32, corresponding to a channel time interval of 3.9 $\mu$sec.
3. Transmission by pulse code modulation of binary code words with $j$=8 bits.

The local clock of the telecommunication exchange (not shown in the Figures) having a cycle time T supplies during each cycle in order of succession the channel time interval signals $t_1$ to $t_n$, which divide the clock cycle into $n$ equal channel time intervals. The transmitting devices 112 to 113 transmit code words through the outgoing trunks during the channel interval signals $t_1$ to $t_n$ of the local clock, which thus determines the time scale of the outgoing trunks. The number of an outgoing channel is then equal to the number of the channel time interval within the clock cycle in which the code words are transmitted through the channel. The code words are transmitted in serial form through the outgoing trunks, in which serial form the bits of the word are transmitted consecutively in corresponding bit intervals. The binary digit 1 is characterized by the presence of a pulse in the corresponding bit interval and the binary digit 0 by the absence of a pulse in the corresponding bit interval. Between given devices of the telecommunication exchange, for example, between the receiving devices 104 to 105 and the line stores 106 to 107 the code words are transmitted in parallel form, which means that the bits of the code word are transmitted simultaneously through a group of parallel conductors. The lines 117 to 118, which connect the receiving devices 104 to 105 to the line stores 106 to 107, therefore comprise a group of parallel conductors. The same applies to the lines 119 to 120, which connect the word selectors 110 to 111 to the transmitting devices 112 to 113.

Since each telecommunication exchange is controlled by clock signals supplied by the relevant local clock, the time scale of the incoming trunks 100 to 101 will deviate from the time scale of the local clock of the exchange on which these trunks terminate. Devices for adapting the time scale of an incoming trunk to the time scale of the local clock are known and do not form the subject matter of the present invention. These devices form parts of the receiving devices 104 to 105. In these devices the incoming code words are transferred to the channel time intervals of the local clock and the fluctuations between the time scales of the incoming trunk and of the local clock are neutralized.

For a good understanding of the invention the operation of these time-matching devices is not essential and it may be supposed that the receiving member 104 to 105 transmit the incoming code words through the lines 117 to 118 to the line stores during the channel time interval signals $t_1$ to $t_n$ of the local clock, i.e. the code words of the incoming channel 1 during the channel time interval signal $t_1$, the code words of the incoming channel 2 during the channel time interval signal $t_2$, etc. or with a given shift between the channel numbers and the numbers of the channel time interval signals. In the known time-matching devices the incoming code words are usually transferred from the serial form to the parallel form and it is therefore supposed that the line stores 106 to 107 receive the code words from the receiving devices 104 to 105 in the parallel form.

The transmitting devices 112 to 113 are known devices whose operation is not essential for a good understanding of the invention. Known transmitting members receive the code words to be transmitted in the parallel form. It is supposed that the transmitting devices are adapted to receive a code word in the parallel form during each channel time interval signal $t_1$ to $t_n$ and to transmit this code word during the next channel time interval signal.

The part of the telecommunication exchange surrounded in FIG. 1 by a broken line will be described in more detail with reference to FIGS. 3, 4 and 5.

The channel time interval signals $t_1$ to $t_n$, supplied by the local clock in each clock cycle in order of succession, are enumerated in each cycle from the origin thereof by 1 to $n$. The numbers of the channel time intervals are indicated by binary code words $At_1$ to $At_n$ of $v$ bits, which represent the decimal digits $l$ to $n$. The channel time interval signals $t_1$ to $t_n$ have the form of pulse code groups appearing in parallel form and representing the binary code words $At_1$ to $At_n$, so that each channel time interval is identified by the code word generated in the relevant channel time interval by the local clock.

In each channel time interval $At_1$ to $At_n$ the clock supplies consecutively the subtime interval signals $w_1$ to $w_n$, which divide each channel time interval into $n$ equal subtime intervals. The subtime interval signals $w_1$ to $w_n$ also have the form of pulse code groups, representing the binary code words $Aw_1$ to $Aw_n$, which represent the numbers 1 to $n$ of the subtime intervals.

In each subtime interval $Aw_1$ to $Aw_n$ the clock supplies consecutively the sub-subtime interval signals $e_1$ to $e_j$, which divide each subtime interval $w$ into $j$ equal sub-subtime intervals. The sub-subtime interval signals $e_1$ to $e_j$ have each the form of a pulse appearing at a separate conductor. In each sub-subtime interval $e_1$ to $e_j$ the clock supplies consecutively two shift signals $a$ and $b$, each having the form of a pulse appearing at a separate conductor.

In each channel time interval $At_1$ to $At_n$ the clock supplies consecutively the subtime interval signals $s_1$ to $s_i$, which divide each channel time interval into $i$ equal subtime intervals $s$. The subtime interval signals $s_1$ to $s_i$ have each the form of a pulse appearing at a separate conductor. In each subtime interval $s$ the clock supplies consecutively two shift pulses $c$ and $d$ at separate conductors. The subtime interval signals $s_1$ to $s_i$ and the shift pulses $c$ and $d$ are only employed in the central control member 114 for controlling the internal information processing.

At a separate conductor the clock supplies channel pulses $t'$ of short duration, which coincide with the shift pulses $a$ in the sub-subtime intervals $e_1$ of the subtime intervals $Aw_1$.

Code words representing channel information are transmitted in the serial form through the switching stage 109 in the subtime intervals $Aw$ with the $j$ bits in the $j$ consecutive sub-subtime intervals $e_1$ to $e_j$.

Code words representing control information are stored in the control stores in the channel time intervals $At$ in the serial form with the $i$ bits in the $i$ consecutive subtime intervals $s_1$ to $s_i$.

FIG. 2 shows the symbols of the logic circuits used in the drawing. These symbols will be explained hereinafter. It will be assumed that the binary digit 1 is represented by a high voltage and the binary digit 0 by a low voltage and that a clock pulse brings the voltage of a conductor to the level of the binary digit 1.

Figure 2A:
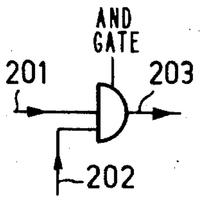

FIG. 2*a* shows the symbol of an AND-gate. The voltage of the output 203 is only high when the voltages of the two inputs 201 and 202 are simultaneously high.

Figure 2B:
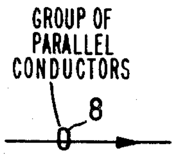

FIG. 2*b* shows the symbol of a group of parallel conductors. The number or the symbol indicates the number of conductors, in this case eight.

Figure 2C:
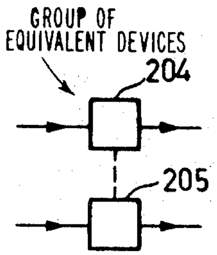

FIG. 2*c* shows a group of equivalent devices, only the first (204) and the last (205) of which are shown.

Figure 2D:
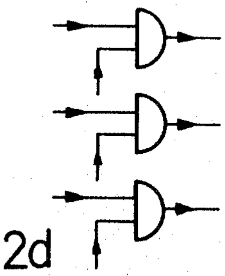
Figure 2E:
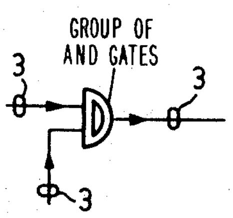

FIG. 2*d* shows a group of AND-gates and FIG. 2*e* the relevant symbol. When corresponding inputs or the outputs are interconnected, the symbol for the corresponding group of conductors is replaced by the symbol for a single conductor.

Figure 2F:
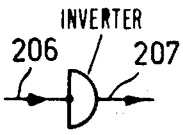

FIG. 2*f* shows the symbol for a not element. When the voltage at the input 206 is high, the voltage at the output 207 is low and conversely.

Figure 2G:
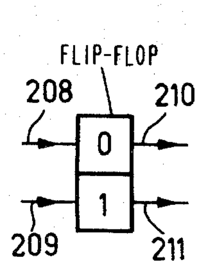

FIG. 2*g* shows the symbol of a bistable trigger. A voltage variation from a low to a high value at the input 208 moves the flip-flop into the 0-state or leaves it in this state. A voltage variation from a low value to a high value at the input 209 moves the flip-flop into the 1-state, when previously a voltage variation from a low to a high value has taken place at the input 208, or the flip-flop is left in the 1-state. Voltage variations from a high to a low value do not affect the state of the flip-flop. In the 0-state the voltage at the output 210 is high and that at the output 211 is low and in the 1-state the voltage at the output 210 is low and that at the output 211 is high.

Figure 2H:
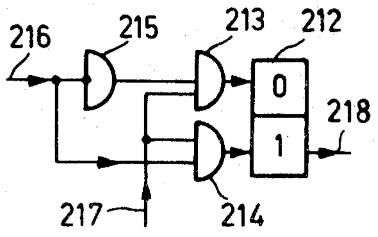
Figure 2I:
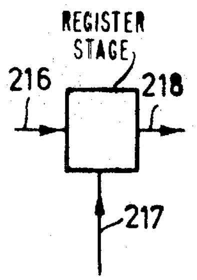

FIG. 2*h* shows a register stage and FIG. 2*i* the relevant symbol. The register stage comprises a flip-flop 212, two AND-gates 213 and 214 and a not element 215. When the voltage at the input 216 is low, the voltage at the output of the not element 215 is high and the voltage at one of the inputs of the AND-gate 213 is then high, so that when the voltage at the clock input 217 becomes high, the flip-flop is changed over to the 0-state. When the voltage at the input 216 is high, the voltage at one of the inputs of the AND-gate 214 is high so that when the voltage at the clock input 217 becomes high, the flip-flop is changed over to the 1-state.

Figure 2J:
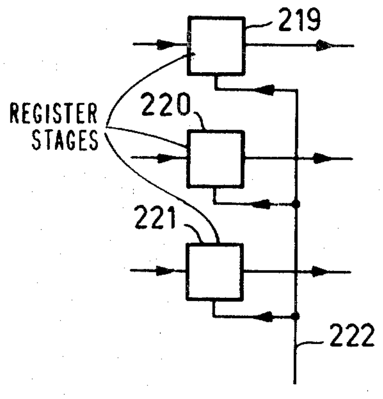
Figure 2K:
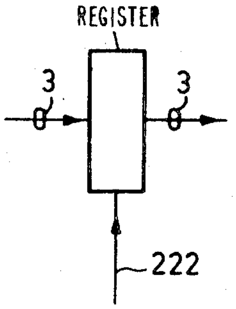

FIG. 2*j* shows a register comprising the register stages 219, 220, 221, whose individual clock inputs are connected to a common clock input 222. FIG. 2*k* shows the symbol used for the register.

Figure 2M:
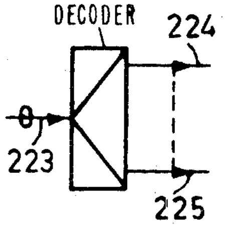

FIG. 2*m* shows the symbol for a decoder. When a binary code word is supplied in the parallel form through the group of conductors 223, the voltage at one of the outputs 224 to 225 is raised to the level of the binary digit 1. To each code word one output is unambiguously allotted.

Figures 2N, 2O, 2P, 2Q, 2R, 2S, 2T:
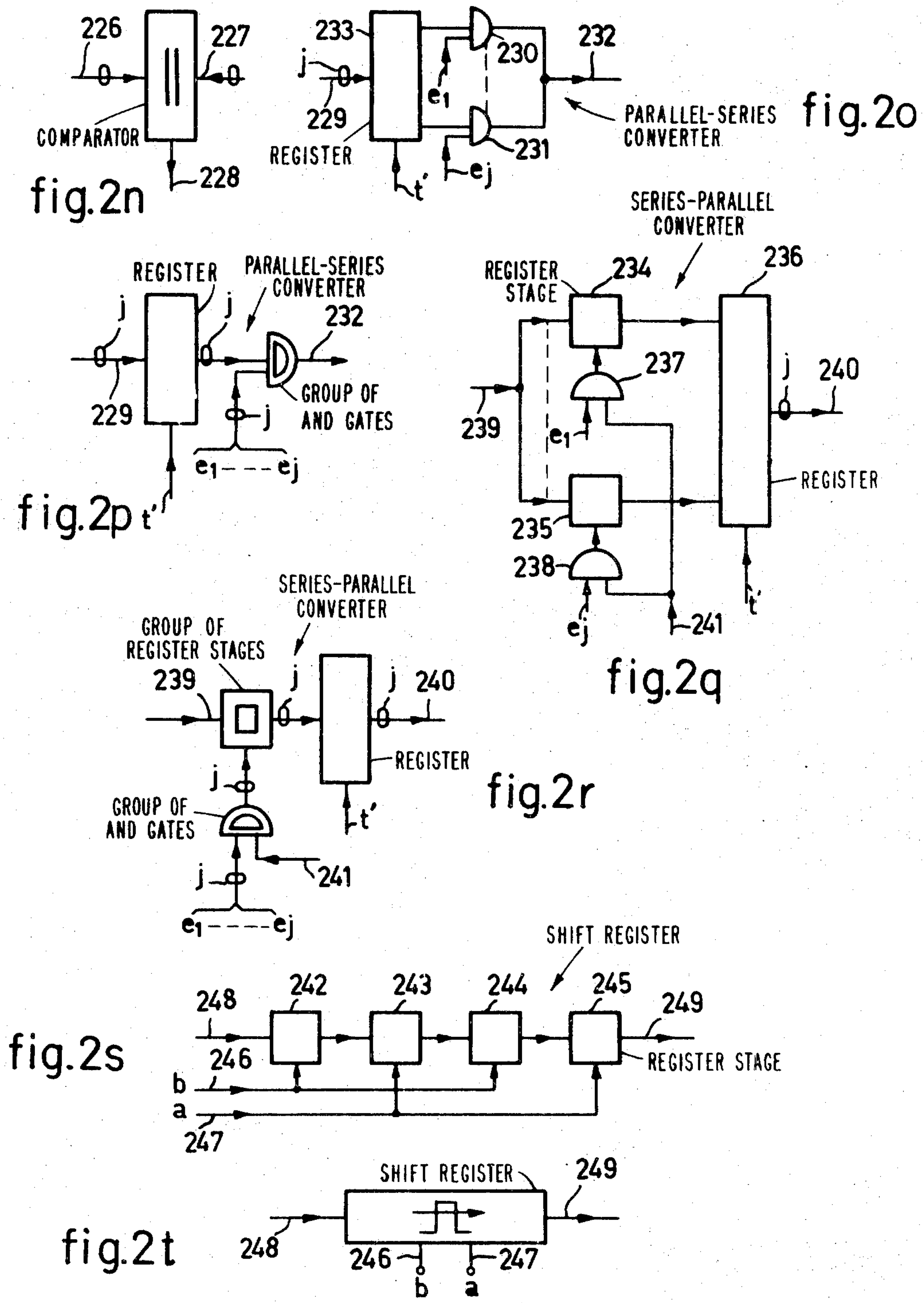

FIG. 2*n* shows the symbol for a comparator for comparing code words supplied through the groups of parallel conductors 226 and 227. When the code word supplied through the group of conductors 226 corresponds in each bit position with the word supplied through the group of conductors 227, the voltage at the output 228 increases to the level of the binary digit 1. The voltage at the output 228 remains high as long as there is a correspondence, so that the duration of the pulse at the output 228 is equal to the duration of the code word having the shortest time duration.

FIG. 2*c* shows a parallel-series converter and FIG. 2*p* the relevant symbol. The parallel-series converter comprises a register 233 and the AND-gates 230 to 231. A code word of $j$ bits supplied through the group of conductors 229 in the parallel form in a channel time interval, is stored during the channel pulse $t'$ of the next channel time interval in the register 233, whose outputs are connected to the AND-gates 230 to 231. To these AND-gates are supplied the sub-subtime interval signals $e_1$ to $e_j$, which render the AND-gates conducting in order of succession, so that the bits of the code word are applied in order of succession in the sub-subtime intervals $e_1$ to $e_j$ to the output 232.

FIG. 2*q* shows a series-parallel converter and FIG. 2*r* the relevant symbol. The series-parallel converter serves for converting into the parallel form code words that are applied each in a subtime interval $Aw$ in the serial form, with the bits in the consecutive sub-subtime intervals $e_1$ to $e_j$, to the input 239.

The series-parallel converter comprises the register stages 234 to 235, a register 236 and the AND-gates 237 to 238, connected to the clock inputs of the register stages. To the AND-gates are applied the sub-subtime interval signals $e_1$ to $e_j$, which render the AND-gates conducting in order of succession for the shift signal $b$ applied to the input 241. The latter signal is applied in each channel time interval A$t$ only once during one subtime interval A$w$. The bit applied to the input 239 in the sub-subtime interval $e_1$ of the subtime interval A$w$ is stored during the shift pulse $b$ in the register stage 234 and the bit applied in the sub-subtime interval $e_2$ is stored during the shift pulse $b$ in the next register stage and so on for the other bits. By varying the subtime interval A$w$, in which the shift pulse $b$ is applied to the input 241 different words received in different subtime intervals A$w$ can be selected. In this manner the series-parallel converter operates in addition as a word selector. During the channel pulse $t'$ of the next channel time interval the code word appearing at the outputs of the register stages 234 to 235 is stored in the register 236 and thereby applied to the group of conductors 240.

FIG. 2$s$ shows a shift register and FIG. 2$t$ the relevant symbol. The shift register comprises the register stages 242, 243, 244, and 245, which are connected into a chain. The clock inputs of the odd register stages 242 and 244 are connected to the common clock input 246 to which the shift pulse $b$ is applied. The clock inputs of the even register stages 243 and 245 are connected to the common clock input 247, to which the shift signal $a$ is applied. The bit applied in a sub-subtime interval $e$ to the input 248 is stored during the shift pulse $b$ in the register stage 242 and then shifted during the next shift pulse $a$ to the register stage 243 and presented to the output thereof during the next sub-subtime interval so that two register stages together provide a delay of one sub-subtime interval. The number of bits that can be stored simultaneously in the shift register is equal to half the number of register stages. The number of register stages is always an even number, but may otherwise be chosen arbitrarily in dependence upon the wanted storage capacity.

FIGS. 3, 4 and 5 show in more detail the part of the telecommunication exchange surrounded by the broken line in FIG. 1. Across the group of conductors 117 the binary code words of $j$ bits of $n$ communication channels are supplied in the channel time intervals A$t_1$ to A$t_n$. Each code word is stored during the channel pulse $t'$ of the next channel time interval in the register of the parallel-series converter 300 and applied to the sub-subtime intervals $e_1$ to $e_j$ in serial form to the AND-gate 301. This transmission of a code word to the AND-gate 301 is performed in each subtime interval A$w_1$ to A$w_n$ so that each received code word is transmitted $n$ times in the serial form to the AND-gate 301. The AND-gate 301 is connected to the input of a shift register 302 of the type shown in FIG. 2$s$, having 2$j.n.$ register stages controlled by the shift signals $a$ and $b$. The delay time of the shift register is $j.n$ sub-subtime intervals $e$ or one channel time interval. The output of shift register 302 is coupled through the AND-gate 303 with the input. The AND-gate 303 is normally open and the AND-gate 301 is normally closed under the control of the line store control device 108. A bit appearing at the output of the shift register during a shift pulse $a$ is normally transmitted through the gate 303 to the input and during the next shift pulse $b$ it is stored in the first stage of the shift register. A bit and in fact the whole stored contents of the shift register comprising $n$ code words continues circulating through the shift register as long as the gate 303 is open. Since the delay time of the shift register is equal to one channel time interval, it will be obvious that all $n$ stored code words are applied once in each channel time interval to the output.

The line store control device 108 comprises a comparator 304, which compares the code words A$t$ and A$w$ applied by the local clock of the telecommunication exchange to the groups of parallel conductors 306 and 307. When the code word A$w$ corresponds with the code word A$t$ in each bit position, a 1-signal is applied to the AND-gate 301 in the relevant subtime interval $Aw=At$, so that this AND-gate is opened and through the not element 305 a 0-signal is applied to the AND-gate 303, which is thus closed. Thus the supply of signals from the parallel-series converter 300 to the shift register 302 is rendered possible during the relevant subtime interval $Aw=At$. The bit applied to the AND-gate 301 in the sub-subtime interval $e_1$ of the subtime interval $Aw=At$ is stored during the shift pulse $b$ in the first stage of the shift register and stored during the next shift pulse $a$ in the second register stage. During the next shift pulse $b$ the second bit of the code word is stored in the first register stage and the first bit is stored in the third register stage and so on until all bits are stored in the register. Then the comparator 304 of the line store control device 108 again supplies signals which close the gate 301 and open the gate 303. In this manner a code word introduced in a channel time interval $At$ into the line store 106 is stored in the shift register 302 in the subtime interval $Aw=At$.

Since the delay time of the shift register is equal to one channel time interval and the store contents constantly circulate, a code word stored in the shift register in the subtime interval $Aw=Atx$ ($x$=1,...$n$) of the channel time interval $Atx$ will be applied to the output of the shift register in any further channel time interval $At$ in the same subtime interval $Aw=Atx$. This is true until in the subtime interval $Aw=Atx$ of the channel time interval $Atx$ a new code word coming in through the same communication channel is stored in the shift register, which code word then occupies the place of the preceding code word. Between the appearance of two code words of the same communication channel or between two channel time intervals $Atx$ a full cycle is performed so that each code word stored in the subtime interval $Aw=Atx$ of the channel time interval $Atx$ is applied to the output of the shift register in the subtime interval $Aw=Atx$ of the $n$ consecutive channel time intervals $At_{(x+1)}$,..$At_n$, $At_1$...$Atx$.

The feedback shift register included in an incoming trunk circuit is typical for a cyclic store having a delay time of one channel time interval and a storing capacity of $j.n$ bits. It will be obvious that in general any type of cyclic store having the same delay time and the same storage capacity may be employed in the incoming main line members. This applies particularly to cyclic stores adapted to be manufactured by mass production, for example, glass delay lines, employed in given types of color television receivers.

The outputs of the shift registers of the line stores 106 to 107 are connected to the horizontal lines 400 to 401 of the switching stage 109 (FIG. 4). The vertical lines 402 to 403 of the switching stage 109 are connected to the word selectors 110 to 111. The cross points of the horizontal lines 400 to 401 with the vertical line 402 are provided with the cross-point gates 404 to 405. An input of each AND-gate is connected to the corresponding horizontal line and a second input of each AND-gate is connected to a corresponding output of a decoder, which is allotted to the corresponding vertical line. The outputs of the AND-gates are connected to the corresponding vertical line.

The number of a time multiplex trunk is represented by a code word of $u$ bits, which is indicated for an incoming trunk by $Aal$ and for an outgoing trunk by $Aul$. The number of a channel is represented by a code word of $v$ bits, which is indicated for an incoming channel by $Aak$ and for an outgoing channel by $Auk$. The binary code words $Aak$ and $Auk$ represent the decimal digits 1 to $n$ in the same manner as the code words $At$ and $Aw$ that are generated by the local clock.

It will be assumed that the number $Aak$ of an incoming channel is given by the number of the channel time interval used by the incoming channel on the group of conductors 117 or 118. The number $Auk$ of an outgoing channel is given by the number of the channel time interval used by the outgoing channel on the outgoing trunk. The central control device 114 does not use the code words $Aak$ and $Auk$ but it uses the code words $A'ak$ and $A'uk$ derived therefrom. The number $A'ak$ is given by the number of the channel time interval having a time lag of one channel time interval with respect to the channel time interval $At=Aak$, which relationship may be represented by: $A'ak=Aak+1$. The number $A'uk$ is given by the number of the channel time interval leading in time by three channel time intervals with respect to the channel time interval $At=Aak$, which relationship may be represented by: $A'uk=Auk-3$. The complete address of a channel is represented by a code word of $u+v=i$ bits obtained by combining the code words of $u$ bits representing the number of the time multiplex trunk with the code word of $v$ bits representing the channel number. This address is represented for an incoming channel by the code word $Aal-Aak$ and for an outgoing channel by the code word $Aul-Auk$.

In order to establish a connection between an incoming channel and an outgoing channel (FIG. 5) the code word $A_{al}-A'_{ak}$ is stored in the register of the parallel-series converter 500 of the central control device 114 and the code word $Aul-A'uk$ is stored in the register 501, after which during one cycle of the local clock through the conductor 502 a 1-signal is applied to the AND-gate 503, which is thus opened. The code word $Aul$ stored in the register 501 is applied to a decoder 507, which decodes the same and supplies a 1-signal at an output corresponding to said code word. A comparator 504 compares the code word $A'uk$ stored in the register 501 with the code words $A_t$ supplied by the local clock. In the case of equality between a code word $At$ and the code word $A'uk$ the comparator 504 supplies a 1-signal during the relevant channel time interval $At=A'uk$, said signal being applied through the AND-gate 503 to the AND-gates 505 to 506, which are connected to the outputs of the decoder 507, said AND-gates being thus opened. The 1-signal appearing at one of the outputs of the decoder 507 is applied through one of the opened AND-gates 505 to 506 to one of the control stores 115 to 116. It will be assumed that the code word $Aul$ indicates the control store 115 allotted to the outgoing trunk 102. The 1-signal of the decoder 507 is then applied through the AND-gate 505 to the control store 115.

The parallel-series converter 500 transmits in the serial form the code word $Aal-A'ak$ in the subtime intervals $s_1$ to $s_i$ to the inputs of the control stores 115, 116, which transmission is repeated in each channel time interval $At$ of the relevant cycle. The control store 115 comprises an AND-gate 508, connected to the input and normally closed under the control of the 0-signal of the AND-gate 505. The output of the AND-gate 508 is connected to the input of a shift register 509 having 2.i.n register stages, controlled by the shift signals $c$ and $d$. The delay time is $i.n$ subtime intervals $s$ or one clock cycle and the storage capacity is $n$ code words of $i$ bits. The output of the shift register 509 is coupled through the AND-gate 510 with the input. The AND-gate 510 is normally open under the control of the 1-signal of the not element 511.

The stored contents of the shift register 509 normally circulate via the opened AND-gate 510 through the shift register and in every clock cycle all $n$ stored code words are once applied to the output. In the channel time interval $At=A'uk$ the decoder 507 applies a 1-signal through the AND-gate 505 to the AND-gate 508, which is thus opened and via the not element 511 a 0-signal is applied to the AND-gate 510, which is thus closed. The bit applied to the AND-gate 508 by the parallel-series converter 500 in the subtime interval $s_1$ is stored in the first stage of the shift register 509 during the shift pulse $d$ and during the next shift pulse $c$ it is stored in the second register stage and so on for the further bits of the code word $Aal-A'ak$. Since the delay time of the shift register 509 is equal to one cycle of the local clock, each code word stored in the shift register in the channel time interval $At=A'uk$ of an arbitrary clock cycle will be applied to the output in each next cycle in the same channel time interval $At=A'uk$. At the termination of the signal applied to the conductor 502 during one clock cycle the gate 503 is closed so that in the next clock cycles the gates 505 to 506 are closed. The contents of the register of the parallel-series converter 500 and of the register 501 may then be varied for establishing a connection between two other channels.

The code word $Aal-A'ak$, appearing at output of the shift register 509 in the channel time interval $At=A'uk$ is transferred by the series-parallel converter 512 to the parallel form and stored in the register thereof during the channel pulse $t'$ of the next channel time interval. The number of the latter channel time interval may be represented by $At=A'uk+1$. The code word $Aal$ stored in the register of the series-parallel converter 512 is applied through the group of parallel conductors 513 to the decoder 406 of the switching stage 109, which decoder subsequently supplies a 1-signal at the output, which corresponds to the code word $Aal$. It is supposed that the code word $Aal$ represents the address of the incoming multiplex trunk 100 so that the decoding member 406 supplies a 1-signal to the AND-gate 404, which is thus opened. The result is that the complete contents of the shift register 302 comprising $n$ code words of the $n$ channels of the incoming main trunk 100 are transmitted through the crosspoint gate 404 to the input of the word selector 110 in the subtime intervals $Aw1$ to $Awn$ of the channel time interval $At=A'uk+1$. The code word $A'ak$ is applied to a comparator 514 which compares the same with the code words $Aw$ supplied by the local clock to the group of conductors 515. When a code word $Aw$ is supplied which corresponds with the code word $A'ak$ the comparator 514 supplies a 1-signal during the corresponding subtime interval $Aw=A'ak$, which signal is applied through the conductor 516 to the word selector 110.

The word selector 110 comprises a parallel-series converter 408 of the type shown in FIGS. 2$q$ and 2$r$, the input of which is connected to the vertical line 402 of the switching stage 109. The parallel-series converter 408 comprises, in the manner as shown in FIG. 2$r$, the group of AND-gates 408–1, the common input of which is connected to the output of the AND-gate 407. The AND-gate 407, which is normally closed under the control of the 0-signal of the conductor 516, receives the shift signal $b$. Since the gate 407 is normally closed, the group of AND-gates 408–1 are also normally closed. The 1-signal of the comparator 514 opens the gate 407 of the word selector 110, so that the shift signal $b$ is applied in the subtime interval $Aw=A'uk$ of the channel time interval $At=A'uk+1$ to the common input of the group of AND-gates 408–1 of the series-parallel converter 408. The result is that the series-parallel converter 408 selects the code word received in the subtime interval $Aw=A'ak$ of the channel time interval $At=A'uk+1$, said code word being transferred from the serial form to the parallel form and then being stored in the register during the channel pulse $t'$ of the next channel time interval $At=A'uk+2$. The selected code word is supplied during the channel time interval $At=A'uk+2$ to the group of conductors 119, which transfer the code word to the transmitting device 112, which transmits the code word in the serial form in the channel time interval $At=A'uk+3$, corresponding to the outgoing channel $Auk$.

The code word selected by the word selector 110 is the code word stored in the shift register 302 in the subtime interval $Aw=A'K=Aak+1$ and it is therefore the code word supplied in the channel time interval $At=Aak$ through the group of conductors 117. This channel time interval corresponds to the incoming channel $Aak$ so that the transmission of a code word of the incoming channel $Aak$ of the incoming trunk 100 to the outgoing channel $Auk$ of the outgoing trunk 102 is carried out.

The transmission of a code word from the incoming channel $Aal-Aak$ to the outgoing channel $Aul=Auk$, described for one clock cycle, is repeated in every further clock cycle so that a permanent time-division communication connection between the two channels is obtained. In order to interrupt the connection, a "zero" code word is stored in the register of the parallel-series converter 500 of the central control member 114 and the code word $Aul-A'uk$ is again stored in the register 500, after which during one cycle a 1-signal is applied to the conductor 502. The result will be that the code word $Aal-A'ak$, stored in the control store 115 is replaced by the "zero" code word. The "zero" code word is chosen so that it does not correspond to any channel address and is located in fact beyond the group of code words accepted by the devices of the telecommunication exchange as addresses or numbers.

When a connection has to be established from a given channel *Aak* of a given incoming trunk *Aal* to any channel of a given outgoing trunk the central processor will first search for a free channel on the relevant outgoing trunk. The selected free outgoing channel $A_{uk}$ occupies on the corresponding vertical line of the switching state 109 the channel time interval *A'uk*+=*Auk*−2. On the horizontal line of the switching stage 109, where the incoming trunk circuit is connected, the channel time interval *Auk*−2 may be occupied already for a further connection. In time-division communication exchanges hitherto known, using only line stores in the incoming trunk circuits and in some of the known time-division communication exchanges using line stores in the incoming and in the outgoing trunk circuits the occupation of the channel time interval *Auk*−2 on the horizontal line of the switching stage 109 would give rise to internal blocking. Such a condition of internal blocking does not occur in the present time-division communication exchange. In the present telecommunication exchange *n* code words from the *n* different incoming channels can be transmitted to the switching network 109 in the *n* consecutive subtime intervals *Aw*1 to *Awn* of any channel time interval and hence also in the given channel time interval *Auk*−2. Each incoming channel *Aak* uses only one subtime interval, i.e. the subtime interval *Aw*=*A'ak*=*Aak*+1, so that even if a connection from an incoming channel on the horizontal line of the switching stage 109 occupies the channel time interval *Auk*−2, only part thereof, i.e. the subtime interval *Aw*=*Aak*+is occupied. The subtime interval *Aw*=*Aak*+1 of a given incoming channel is therefore free in each channel time interval and hence also in the given channel time interval *Auk*−2 on the relevant horizontal line of the switching stage 109, when the channel does not yet form part of a connection as is the case with the incoming channel for which a connection has to be established. It is thus always possible to establish a communication between an incoming channel and a free outgoing channel.

Time-division telecommunication exchanges having a great number of trunks can be realized in a simple manner by dividing the trunks in groups and by using, instead of the switching stage 109, a multistage space division switching network and by connecting each group of incoming trunks to inputs of a separate matrix switch of the first stage and each group of outgoing trunks to outputs of a separate matrix switch of the last stage. The property of nonblocking of the telecommunication exchange can be maintained by using a nonblocking switching network.

What is claimed is:

1. An arrangement for a telecommunication exchange comprising a first line member connected to a first multiplex line through which are transmitted in the incoming direction of transmission channel information originating from a plurality of first transmission channels each comprising a plurality of words in time-division multiplex in first-channel time intervals individually associated with said first transmission channels of a repetitive first cycle of channel time intervals and comprising a second line member connected to a second multiplex line through which are transmitted in the outgoing direction words of channel information intended for a plurality of second transmission channels in time-division multiplex in second-channel time intervals individually associated with said second transmission channels of a repetitive second cycle of channel time intervals, the cycle time of the second cycle of channel time intervals being equal to that of said first cycle, and furthermore comprising an internal transmission path within the arrangement connecting said first line member to said second line member and including at least one switching gate, the first line member comprising a cyclic storage member having a storage cycle time equal to the duration of a cycle of second-channel time intervals, and comprising for every word of said first transmission channels a storage location in which a word of channel information can be stored, said arrangement comprising furthermore first control means for storing words of channel information from every transmission channel in a storage location of the cyclic storage member individually associated with said first transmission channel, said first line member comprising means for supplying, during each storage cycle, the words of channel information stored in the cyclic storage member to said internal transmission path, characterized in that, the arrangement comprises second control means for controlling said switching gate into the conductive state during and for the duration of a selected second-channel time interval of every said second cycle of channel time intervals, third control means to supply the address of a selected storage location of said cyclic storage member to said second line member at a time associated with said selected second-channel time interval, and the second line member comprises selection means for selecting, during the said selected second-channel time interval the word of the channel information originating from the storage location identified by said address.

2. An arrangement as claimed in claim 1, characterized in that the second and third control means are together formed by a cyclic control storage member having a storage cycle time equal to the cycle time of said first and second cycles, said cyclic storage member having a storage location for every second-channel time interval, in which the address of the switching gate and the address of a storage location of the cyclic storage member included in the first line member, can be stored.

3. An arrangement as claimed in claim 2, characterized in that it comprises a cyclic address generator whose generator cycle time is equal to a second-channel time interval, said generator producing in every generator cycle the address of the storage locations from which emanate the channel informations transmitted by the first line member to the second line member, while the second line member has associated with it a comparison device for comparing the storage location address supplied by the cyclic control storage member with the storage location addresses produced by the cyclic address generator.

* * * * *

PO-1050
(5/69)

UNITED STATES PATENT OFFICE
CERTIFICATE OF CORRECTION

Patent No. 3,632,883 Dated January 4, 1972

Inventor(s) EINAR A. AAGAARD

It is certified that error appears in the above-identified patent and that said Letters Patent are hereby corrected as shown below:

Col. 4, line 65, "supplied" should be --applied--;

Col. 8, line 56, "A'K" should be --A'ak--;

Col. 9, line 9, "A'uk += Auk-2" should be --A'uk +1 =Auk-2--;

line 30, "Aw = Aak +is" should be --Aw = Aak +1 is--.

Signed and sealed this 4th day of July 1972.

(SEAL)
Attest:

EDWARD M. FLETCHER, JR.
Attesting Officer

ROBERT GOTTSCHALK
Commissioner of Patents